United States Patent [19]
Nishiguchi et al.

[11] Patent Number: 5,151,941
[45] Date of Patent: Sep. 29, 1992

[54] DIGITAL SIGNAL ENCODING APPARATUS

[75] Inventors: Masayuki Nishiguchi; Yoshihito Fujiwara; Tomoko Umezawa, all of Kanagawa, Japan

[73] Assignee: Sony Corporation, Tokyo, Japan

[21] Appl. No.: 588,715

[22] Filed: Sep. 7, 1990

[30] Foreign Application Priority Data

Sep. 30, 1989 [JP] Japan ................ 1-255798

[51] Int. Cl.⁵ .......................... G10L 3/00; G10L 5/00; G10L 7/02
[52] U.S. Cl. ........................ 381/46; 381/36; 381/47; 381/37
[58] Field of Search ................ 381/29-31, 381/36-37, 40, 41, 46, 34, 47, 71, 73.1

[56] References Cited
U.S. PATENT DOCUMENTS

| | | | |
|---|---|---|---|
| 4,535,472 | 8/1985 | Tomcik | 381/31 |
| 4,805,193 | 2/1989 | McLaughlin et al. | 381/29 |
| 4,811,398 | 3/1989 | Copperi et al. | 381/37 |
| 4,831,624 | 5/1989 | McLaughlin et al. | 381/46 |
| 4,868,868 | 9/1989 | Yazu et al. | 381/37 |
| 4,896,362 | 1/1990 | Veldhuis et al. | 381/37 |
| 4,964,166 | 10/1990 | Wilson | 381/37 |
| 5,001,761 | 3/1991 | Hattori | 381/46 |

Primary Examiner—Emanuel S. Kemeny
Assistant Examiner—Kee M. Tung
Attorney, Agent, or Firm—Lewis H. Eslinger; Jay H. Maioli

[57] ABSTRACT

A digital signal encoding apparatus in which input digital signals are divided into a plurality of frequency bands so that the bandwidth of each frequency band will be greater the higher the frequency band, the allowable noise level is set for each frequency band on the basis of the energy value of each frequency band, and components of each frequency band are quantized with the number of bits consistent with the level difference between the energy of each frequency band and the preset allowable noise level. The output information volume following the quantization is detected and the number of bits of allocation for quantization is corrected in dependence upon the error between the detection output and the target value to render the information volume constant over a predetermined time period to enable bit rate adjustment or bit packing with lesser signal deterioration by a simplified construction.

6 Claims, 10 Drawing Sheets

DIGITAL SIGNAL ENCODING APPARATUS

BACKGROUND OF THE INVENTION

This invention relates to a digital signal encoding apparatus for encoding input digital signals.

In high efficiency encoding of audio, voice, or like signals, there is known an encoding technique using bit allocation, according to which input audio or voice signals are divided into a plurality of channels on a time axis or a frequency axis and the numbers of bits are adaptively allocated to these channels. Among the encoding techniques for audio signals by bit allocation are a sub-band coding (SBC) in which audio signals on the time axis are divided into a plurality of frequency bands for encoding; an adaptive transform coding (ATC) in which the signals on the time axis are converted by orthogonal transform into those on the frequency axis and divided into a plurality of frequency bands so as to be adaptively encoded in each frequency band; and adaptive bit allocation (APC-AB) which is a combination of the SBC and APC and in which the signals on the time axis are divided into a plurality of frequency bands and the signals of each frequency band are converted into baseband signals (low frequency range signals) so as to be then predictively encoded by linear predictive analyses of a plurality of orders.

It is to be noted that, in the above described band division and encoding, for example, the number of bits provided to each band resulting from division is dynamically or adaptively changed as a function of time fluctuations of the signal spectral intensity, while the bit rate for each constant unit time block is maintained constant. On the other hand, in the above mentioned adaptive transform encoding, the number of bits in changed dynamically on the frequency axis.

With the above mentioned high efficiency encoding by adaptive bit number allocation, the bit rate per unit block (unit time block or unit frequency block) may not be constant, depending on the manner of allocating the number of bits, with the result that the bits may be in surplus or in deficit. That is, it may occur that, for a given bit rate, the bits may be in surplus or in deficit in the high or low signal level regions, respectively, on the time axis or on the frequency axis.

Should the number of bits be in surplus or in deficit, it has been necessary to resort to a technique of bit rate adjustment or "bit packing" for effective adjustment of the number of bits.

The bit rate adjustment means an operation of decreasing or increasing the number of bits afforded to a unit block, when the bits are in surplus or in deficit in such unit block, so that the bit rate in its entirety is constant. This bit rate adjustment is thought to be feasible by using a functional block as shown for example in FIG. 1. In this figure, the number of allocated bits for quantization is determined at a bit allocation number decision block 90, to which input digital signals are applied, and the bit rate adjustment or bit packing is performed in the bit rate adjustment block 91 as a function of the spectral intensity of the unit block of the input digital signals. Then, using the number of bits determined by the bit rate adjustment, the encoding or requantization is performed in an encoding functional block 92 to produce output signals.

However, there lacks up to now an effective and simple method for bit rate adjustment performed at the bit rate adjustment block 91 whereby signal deterioration may be made less outstanding. Thus a demand has been raised for establishment of a method for effective bit rate adjustment.

On the other hand, in high efficiency encoding, techniques of high efficiency encoding which take the properties of "masking effects" in the human auditory sense into account, are investigated extensively. The masking effects means a phenomenon in which certain signals are masked by other signals and become inaudible. The masking effects are classed into those on audio signals on the time axis and those on the frequency axis.

The masking effects on audio signals on the frequency axis are hereinafter explained. For a sinusoidal wave Ws of a frequency fs, the masking spectrum or masking curve MS, expressing the masking effect by the human auditory sense, is as shown in FIG. 2, and a zone shown by hatching in FIG. 2 is masked by this masking spectrum MS. That is, any noise in the masking spectrum MS becomes inaudible, so that, in the actual audio signals, any noise in the masking spectrum MS is permissible. Thus the allowable noise level for the sinusoidal wave Ws is below a level j in FIG. 2. It is noted that the masking effect becomes maximum at the frequency fs of the sinuoidal wave Ws and becomes progressively low in a direction away from the frequency fs.

On the other hand, in usual audio signals, the signal spectrum SS exhibits an energy concentration in the low frequency range, as shown in FIG. 3. The masking spectrum in this case is as shown by a broken line in FIG. 3. This means that, if the spectrum of the noise produced at the time of quantization or encoding of the audio signals of the signal spectrum SS is within the hatched zone in FIG. 3, the noises are masked by the masking spectrum MS of the audio signals, so that deterioration in sound quality is not perceived by human ears. Thus a technique of controlling the spectrum of the quantization noise at the time of quantization is though to be effective against deterioration of sound quality.

However, with the above mentioned technique employing the masking effects, since the contour of the masking spectrum is determined by the contour of the signal spectrum, as shown in FIG. 3, more bits are afforded to high frequency regions with low signal energies, with the consequence that it becomes difficult to lower the bit rate.

OBJECT AND SUMMARY OF THE INVENTION

It is therefore an object of the present invention to provide a digital signal encoding apparatus whereby bit rate adjustment or bit packing may be performed with less apparent signal deterioration despite its simplified structure.

It is another object of the present invention to provide a digital signal encoding apparatus in which quantization is performed with the number of quantization bits being selected to take the energy and the contour of the signal spectrum of audio and voice signals into account so as to lower the bit rate and to minimize deterioration in sound quality despite the low bit rate.

The present invention provides a digital signal encoding apparatus comprising a sum detection-filter circuit, as noise level setting means, for dividing input digital signals into a plurality of frequency bands in which the bandwidth is wider for higher frequencies, the noise level setting means being adapted to set an allowable noise level for each band on the basis of the energy for each band. and a quantization circuit for quantizing the components of each band with the number of bits consistent with the level difference between the energy of each band and the output of the noise level setting means, wherein the volume of output information of that quantization circuit is detected and the bit allocation for the quantization circuit is corrected in dependence upon the error between the detection output and the target value to render the information volume constant over a predetermined time interval.

The bit allocation for the quantization circuit may be corrected on the basis of the detection output and the energy of each band to render the volume of information constant over a predetermined time interval.

Alternatively, the noise level setting means may be controlled as a function of the detection output to render the information volume constant over a predetermined time interval.

The noise level setting means may also be designed to set the allowable noise level so as to be higher for the same energy towards the side of higher frequencies.

According to the present invention, the bit allocation at the time of quantization is increased or decreased by a predetermined constant amount on the basis of the error between the target value and the detection output of the volume of output information of quantization means and the target value or the energy of each frequency band.

The allowable noise level is also selected to be higher in a direction towards the lower energy or higher frequency of the frequency band so that the number of bits of allocation will be less for higher frequencies.

DESCRIPTION OF THE PREFERRED EMBODIMENTS

By referring to the accompanying drawings, preferred illustrative embodiments of the present invention will be explained in detail.

Figure 4:
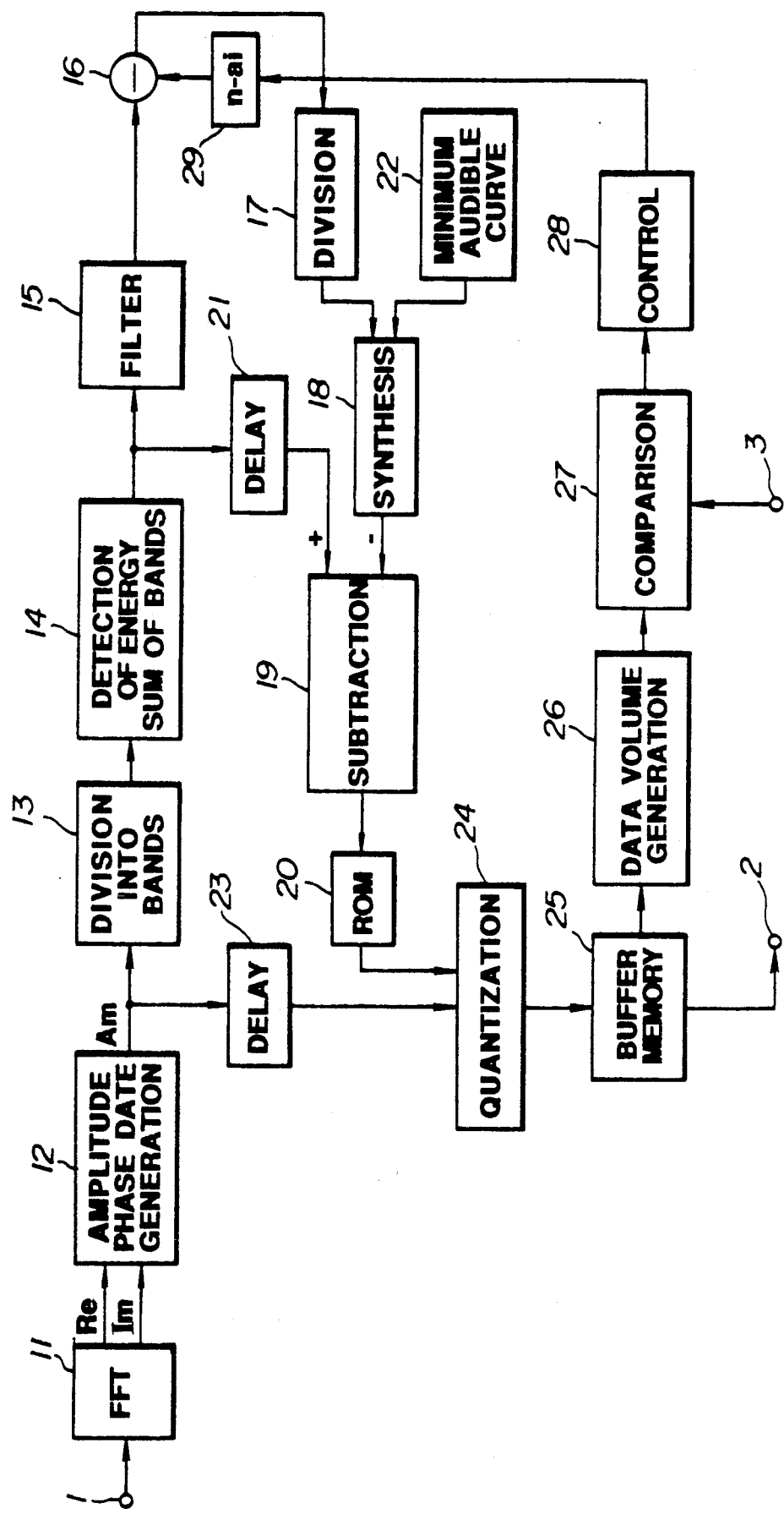
FIG. 4 is a block diagram showing an outline of a digital signal encoding apparatus according to an embodiment of the present invention.
Figure 10A:
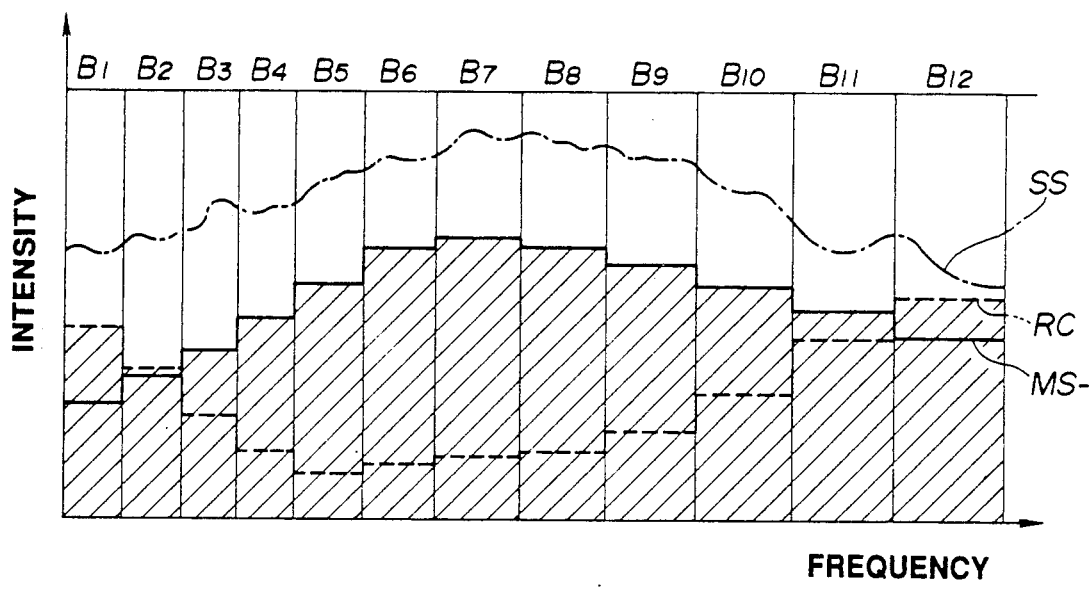
FIG. 10A is a chart showing a masking spectrum, increased in level, which is synthesized with the minimum audible curve.
Figure 10B:
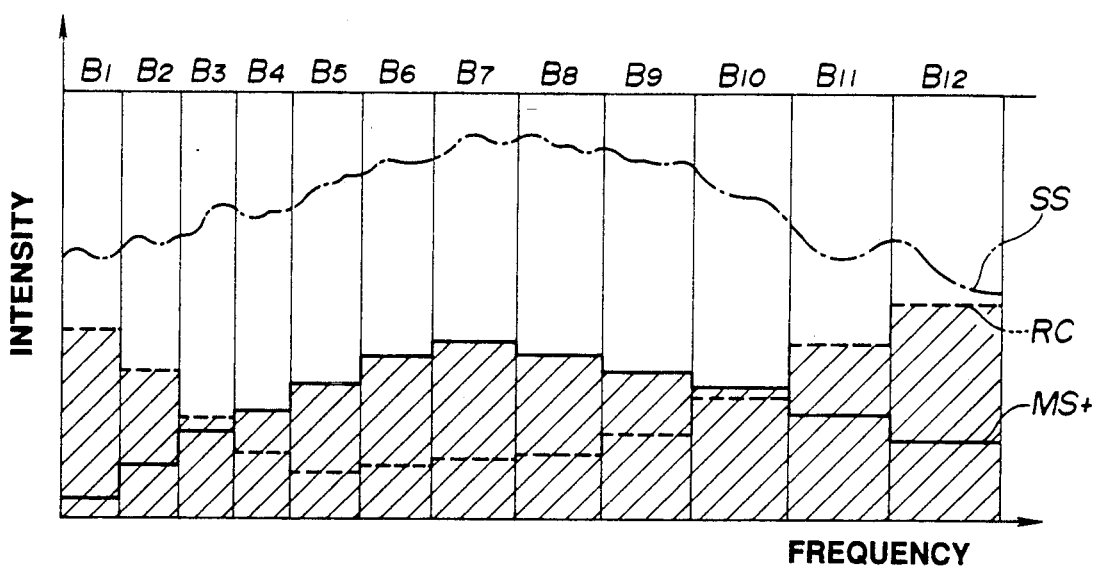
FIG. 10B is a chart showing a masking spectrum, decreased in level, which is synthesized with the minimum audible curve.

The digital signal encoding apparatus of the present embodiment is adapted to realize high efficiency encoding of input digital signals, such as audio or voice signals, by sub band coding (SBC), adaptive transform coding (ATC) or adaptive bit allocation (APC-AB). Thus, with the present embodiment, the input digital signals are divided into a plurality of frequency bands and wider bandwidths are used for higher frequency ranges. That is, the input digital signals are divided by so-called critical bandwidths which, take into account the human auditory characteristics which will be explained subsequently. As shown in FIG. 4, the digital signal encoding apparatus is constituted by a sum detection circuit 14 and a filter circuit 15 as noise level setting means for setting the allowable noise level for each band on the basis of the energy value, peak value or mean value for each critical band. a minimum audible curve setting circuit 22 responsive to the human frequency analysis capability, a synthesis circuit 18 for synthesizing the outputs of the noise level setting means and the minimum audible curve setting circuit 22, and a quantization circuit for quantizing frequency components of the bands by the numbers of the bits allocated in accordance with the level of the difference between the energies of the respective bands and the outputs of the synthesis circuit 18. The output information volume of the quantization circuit 24 is detected by a data volume computing circuit 26 as later described. and the noise level setting means is controlled as a function of the detection output and by an allowance function from an allowance function generator 29 controlled by an allowance function control circuit 28 to provide for a constant volume of information during a predetermined time period. that is, in the present embodiment, the allowable noise level is changed by changing the above mentioned allowance function, as shown in FIGS. 10A and 10B, for adjusting the bit rate so as to be constant in its entirety.

The quantization output from the quantization circuit 24 is outputted from an output terminal 2 via buffer memory 25 of the digital signal encoding apparatus of the present embodiment.

The digital signal encoding apparatus of the present embodiment shown in FIG. 4 is adapted for converting audio or voice signals by fast Fourier transform (FFT) for transforming the signals on the time axis into those on the frequency axis so as to effect encoding or requantization.

That is, referring to FIG. 4, audio signals, for example, are supplied to an input terminal 1, and it is these audio signals on the time axis that are transmitted to a fast Fourier transform (FFT) circuit 11. In the FFT circuit 11, the audio signals on the time axis are converted at a predetermined time interval or unit block to produce FFT coefficients each consisting of a real number component Re and an imaginary number component Im. These FFT coefficients are transmitted to an amplitude phase information generator 12 where an amplitude value Am and a phase value are obtained from the real number component Re and the imaginary number component Im and the amplitude value Am is outputted from the generator 12. In general, the human ear is sensitive over the audio amplitude or power of the frequency range, while it is rather insensitive to the phase, so that, in the present embodiment, only the amplitude value Am is taken out from the output terminal of the amplitude phase information generator 12 as the input digital signals to the encoding apparatus of the present embodiment.

Figure 5:
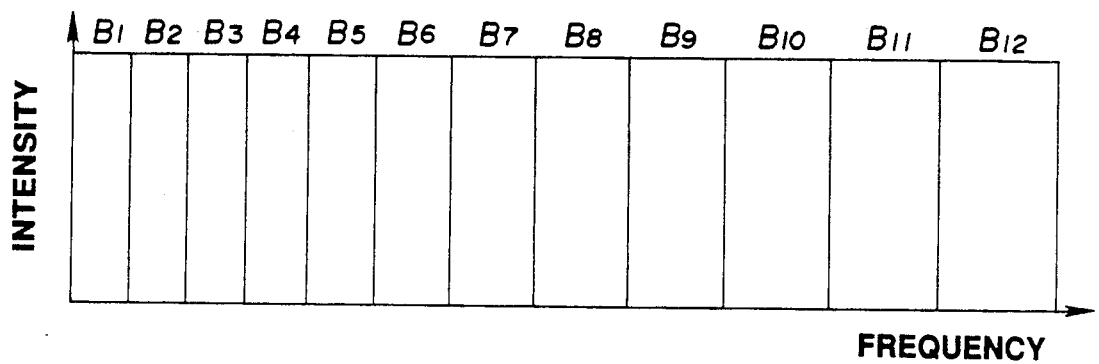
FIG. 5 is a diagrammatic view showing critical bands.

The input digital signals, such as the amplitude value Am, obtained in this manner, are transmitted to a band division circuit 13. In this division circuit 13, the input digital signals, expressed as the amplitude value Am, are divided into so-called critical bands. With the critical bands, in which the human auditory characteristics or frequency analysis capability is taken into account, the frequency of 0 to 16 kHz is divided into 24 bands, the bandwidths of which are selected to be wider towards the higher frequency side. Meanwhile, the human auditory sense has characteristics comparable to those of a series of bandpass filters. The frequency bands thus divided by these filters are termed the critical bands. These critical bands are shown in FIG. 5. For illustrating the drawing, the critical bands are expressed by 12 frequency bands $B_1$ to $B_{12}$.

The amplitude values Am of the bands, for example the 24 bands, divided into the critical bands in the band division circuit 13, are transmitted to the sum detection circuit 14. In the sum detection circuit 14, the energy for each band, that is the spectral intensity for each band, may be found by taking the sum of the energy values Am in the bands (the peak or mean values of the amplitude value Am or the sum of the energies). The output of the sum detection circuit 14, that is the sum spectrum of each band, is generally termed the Burke spectrum. The Burke spectrum SB of each band is as shown for example in FIG. 6.

Figure 6:
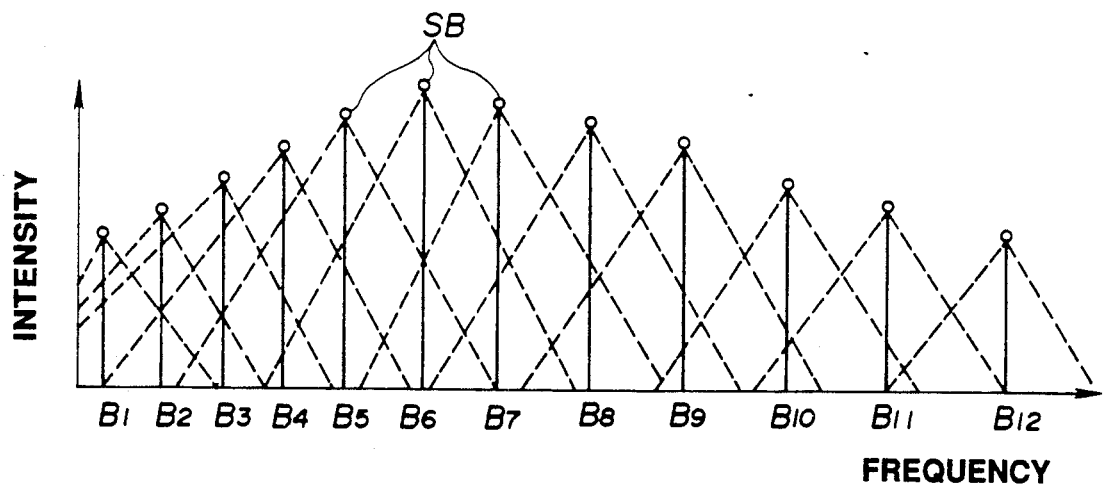
FIG. 6 shows a Burke spectrum.
Figure 7:
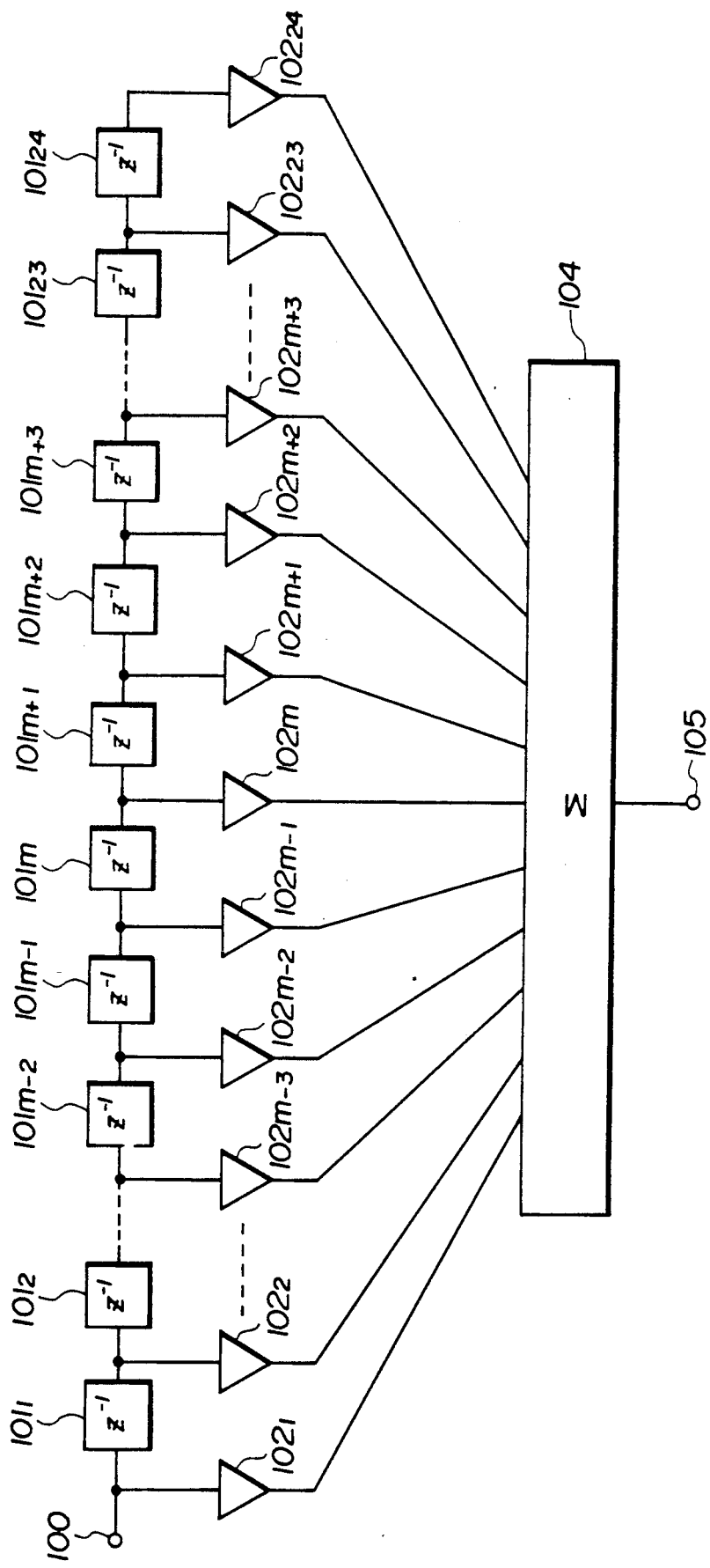
FIG. 7 is a circuit diagram showing a filter circuit.

For taking into account the effect of the Burke spectrum SB on masking, predetermined weighting functions are convolved into the Burke spectrum SB. The output of the sum detection circuit 14, that is, the values of the Burke spectrum SB, is transmitted to filter circuit 15. As shown in FIG. 7, the filter circuit 15 is constituted by delay elements $(Z^{-1})$ $101_1$, $101_2$, . . . , $101_{m-2}$-$101_{m+3}$, . . . , $101_{23}$ and $101_{24}$, that is the 24 delay elements associated with the critical bands, 24 multipliers $102_1$, $102_2$, . . . , $102_{m-3}$-$102_{m+3}$, . . . $103_{23}$ and $102_{24}$, and a sum computing unit 104. At this time, filter coefficients 0.0000086, 0.0019, 0.15, 1, 0.4, 0.06 and 0.07 are multiplied at the multipliers $102_{m-3}$, $102_{m-2}$, $102_{m-1}$, $102_m$, $102_{m+1}$, $102_{m+2}$ and $102_{m+3}$ to outputs of the associated delay elements, respectively, to effect convolution of the Burke spectrum SB. By this convolution, the sum is taken of the portions indicated by broken lines in FIG. 6. The masking is a phenomenon in which a signal is masked by another signal by human auditory characteristics and becomes inaudible. The masking effect is classed into that on audio signals on the time axis and that on signals on the frequency axis. By such masking effect, any noise, if any, contained in the masked signal, becomes inaudible. Hence, in actual audio signals, these noises in the masked signal represent allowable noises.

The output of the filter circuit 15 is supplied to a subtractor 16 where a level $a$ corresponding to the allowable noise level in the convolved region is found. The level $a$ corresponding to the allowable noise level means a level which will prove to be an allowable noise level for each critical band as a result of deconvolution as will be explained subsequently. The allowance function, that is the function expressing the masking level, for finding the level $a$, is supplied to the subtractor 16. The level $a$ is controlled by increasing or decreasing the allowance function. This allowance function is supplied from a function generator 29 controlled by function controller 28 which will be explained subsequently.

If the number of the critical bands looking from the low frequency side is expressed as i, the level $a$, corresponding to the allowable noise level, is given by the following formula (1):

$$a = S - (n - ai) \qquad (1)$$

where n and a are constants with a>0, S is the intensity of the Burke spectrum after convolution and (n−ai) in the formula represents the allowance function. By changing the allowance function, the level $a$ may be controlled and the bit rate adjusted so that, as a result, the allowance function may be controlled to provide for the constant bit rate. In the present embodiment, bit rate adjustment may be performed with n=38 and a=1 or n=24 and a=1, as an example.

It will be noted that, if the level $a$ corresponding to the allowable noise level, as later described, for computing the masking spectrum of the Burke spectrum SB, that is the allowable noise spectrum, is low, the masking level or the masking curve is decreased, so that it becomes necessary to increase the number of bits allocated at the time of quantization of the quantization circuit 24. Conversely, if the level $a$ is high, the masking level is increased, with the result that the number of bits allocated at the time of quantization may be diminished. Moreover, in audio signals in general, the spectral intensity or energy in the high frequency range is low. Hence, in the present embodiment, the level $a$ is increased progressively towards the higher frequency side with lower energy levels to decrease the number of bits allocated to the high frequency range. In this consideration, the noise level setting means may be so designed that the level $a$ is set to a progressively high level for the same energy towards a higher frequency. In this case, the level $a$ corresponding to the allowable noise level is computed and control is made so that the level $a$ becomes progressively higher towards the high frequency side.

Figure 8:
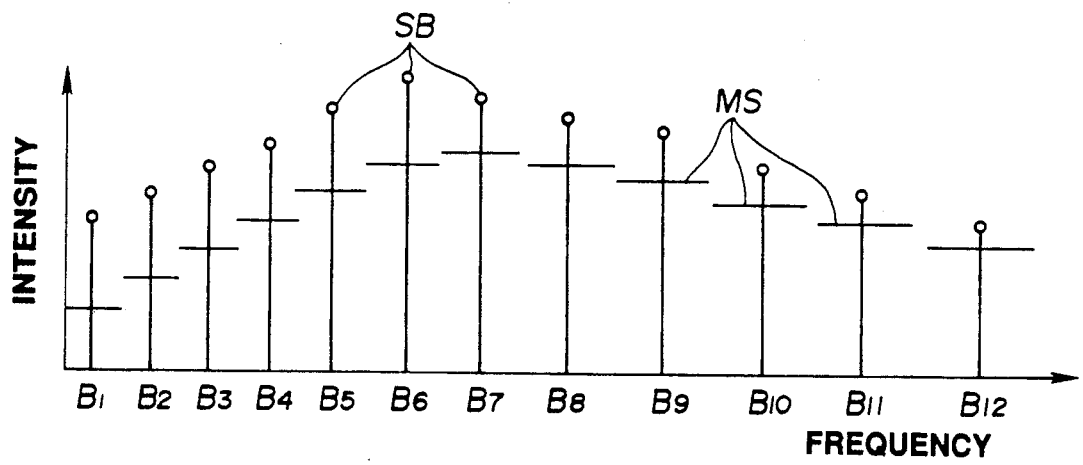
FIG. 8 is a chart showing a masking spectrum.

The level $a$ is found in the above described manner and the corresponding data are transmitted to a divider 17 which is adapted for deconvolving the level $a$ in the convolved region. Hence, by performing this deconvolution, the masking level may be obtained from the above mentioned level $a$. That is, this masking spectrum represents the allowable noise level. Although a complex processing is necessitated for deconvolution, a simplified divider 17 is used in the present embodiment for deconvolution. FIG. 8 shows a so-found masking spectrum MS. That is, with the Burke spectrum SB, the level lower than the respective levels of the masking spectrum MS is masked.

Figure 9:
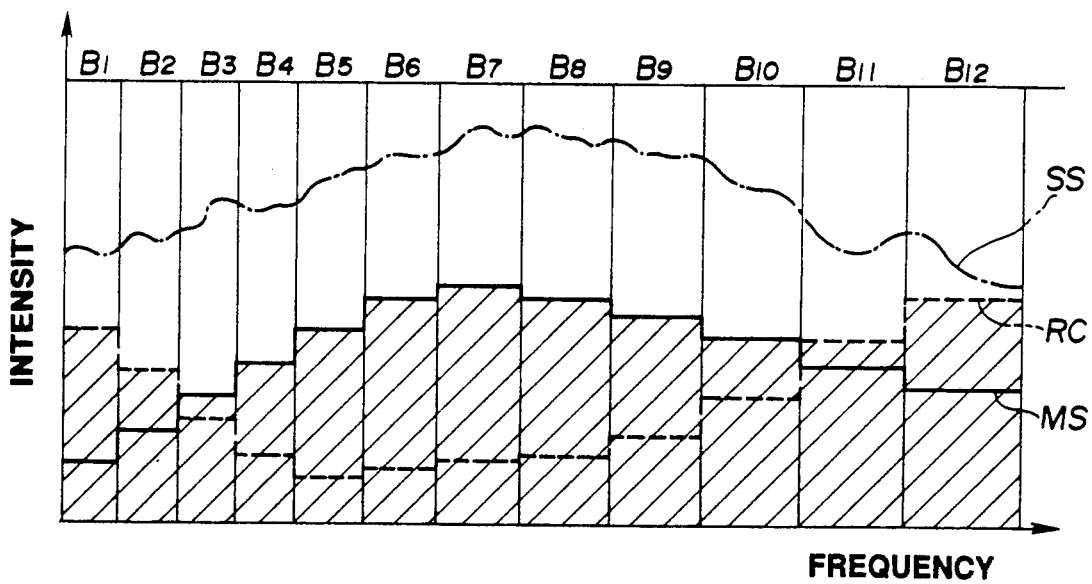
FIG. 9 is a chart showing a minimum audible curve and a masking spectrum.

The output of the divider 17 is transmitted to synthesis circuit 18 to which the output from the minimum audible curve setting circuit 22 is also supplied. Thus the data representing the so-called minimum audible curve or equal loudness curve RC from the minimum audible curve generating circuit 23, indicating the human auditory characteristics, as shown in FIG. 6, are synthesized with the output of the divider 17, that is the masking spectrum MS. Hence, by synthesizing this minimum audible curve RC and the masking spectrum MS, the allowable noise level may be brought up to a portion shown by hatching lines so that the number of bits allocated for quantization may be reduced in an amount corresponding to the portion shown by the hatching lines. In FIG. 9, the frequency domain is indicated by the above mentioned critical bands, shown in FIG. 5. In FIG. 9, the signal spectrum SS is also shown.

The data from the buffer memory 25 are transmitted to a data volume processing circuit 26, where the data volume is found and transmitted to a comparator. In the comparator 27, the data volume from circuit 26 is compared with the target value of the bit rate for bit adjustment from terminal 3 and the result of comparison is transmitted to the aforementioned function control circuit 28. The noise allowance function generator 29 is controlled by the function control circuit 28 for computing the allowance function for finding the level $a$ supplied to the subtractor 16. With change in the allowance function, the masking spectrum MS shown in FIG. 9 is translated in the vertical direction. The states of translation of the masking spectrum MS are shown in FIGS. 10A and 10B. Thus FIG. 10A shows the masking spectrum MS which has been translated in the direction in which the levels of the masking spectrum MS of FIG. 9 are increased, and FIG. 10B the masking spectrum $MS_-$ which has been translated in the direction in which the levels of the masking spectrum MS of FIG. 9 are decreased.

The output of the synthesis circuit 18 is transmitted to a subtractor 19, to which the output of the sum detection circuit 14, that is the aforementioned Burke spectrum SB, is supplied by way of delay circuit 21. Thus a subtracting operation is performed in subtractor 19 between the masking spectrum MS and the Burke spectrum SB to find the level at which the Burke spectrum SB is masked, as described in connection with FIG. 8.

The output of the subtractor 19 is supplied to a quantization circuit 24 by way of ROM 20. The quantization circuit 24 quantizes the amplitude value Am supplied by way of delay circuit 23 with a number of bits allocated in accordance with the output of the subtractor 19. In other words, the quantization circuit 24 quantizes the components of each of the critical bands with the number of bits allocated in accordance with the difference between the energy of the band and the output of the synthesis circuit 18. The delay circuit 21 is provided for delaying the Burke spectrum SB from the sum detection circuit 14 in consideration of the delay introduced in the circuitry upstream of the synthesis circuit 18, whereas the delay circuit 23 is provided for delaying the amplitude Am in consideration of the delay introduced in the circuitry upstream of the ROM 20. The ROM 20 is used for storing data concerning the numbers of allocated bits.

It will be seen from the foregoing that with the present digital signal encoding apparatus, the volume of the output information of the quantization circuit 24 is detected and the noise level setting means is controlled as a function of the detection output to perform the operation of maintaining the constant information volume over a predetermined time period (unit time block of frame), that is, the bit rate adjustment operation. Thus it becomes possible to vary the bit rate while keeping the minimum audible curve constant or, alternatively, for noises exceeding the masking spectrum, to vary the noise distribution as a function of the level.

If, as a result of bit rate adjustment, the number of bits falls short and thus decreased, the S/N ratio of the audio signals is worsened. Conversely, if the number of bits is in excess and thus increased, the S/N ratio is improved. That is, as a result of bit adjustment, the noise spectrum is changed in contour with respect to the signal spectrum, with resulting demonstration of merits and demerits proper to the S/N ratio.

Figure 1:
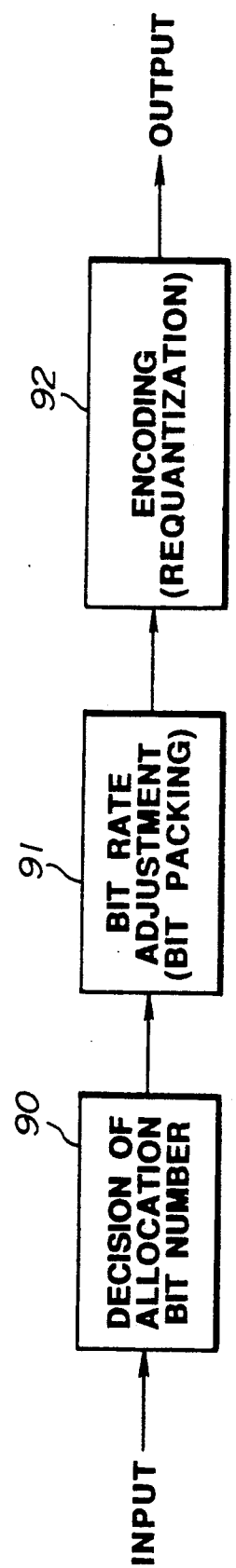
FIG. 1 is a functional block diagram for bit rate adjustment.
Figure 2:
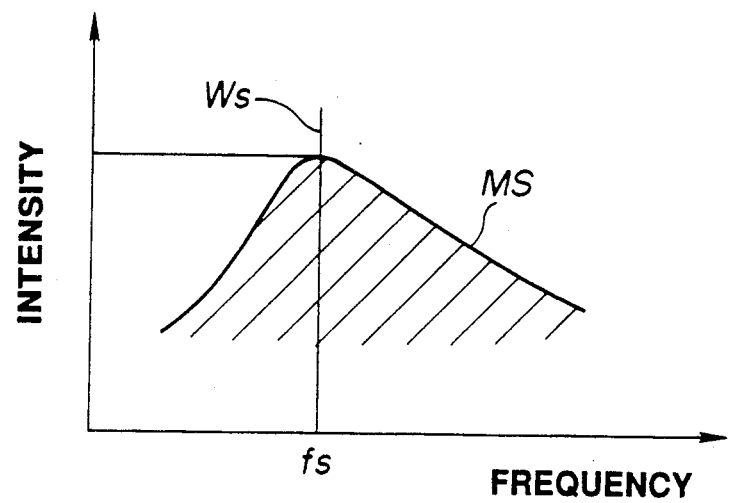
FIG. 2 is a chart showing the masking spectrum for human ears.
Figure 3:
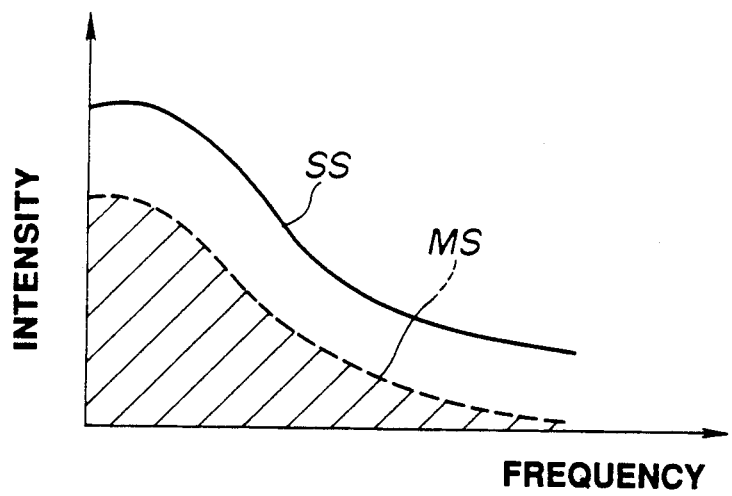
FIG. 3 is a chart showing the spectrum of audio signals.
Figure 11:
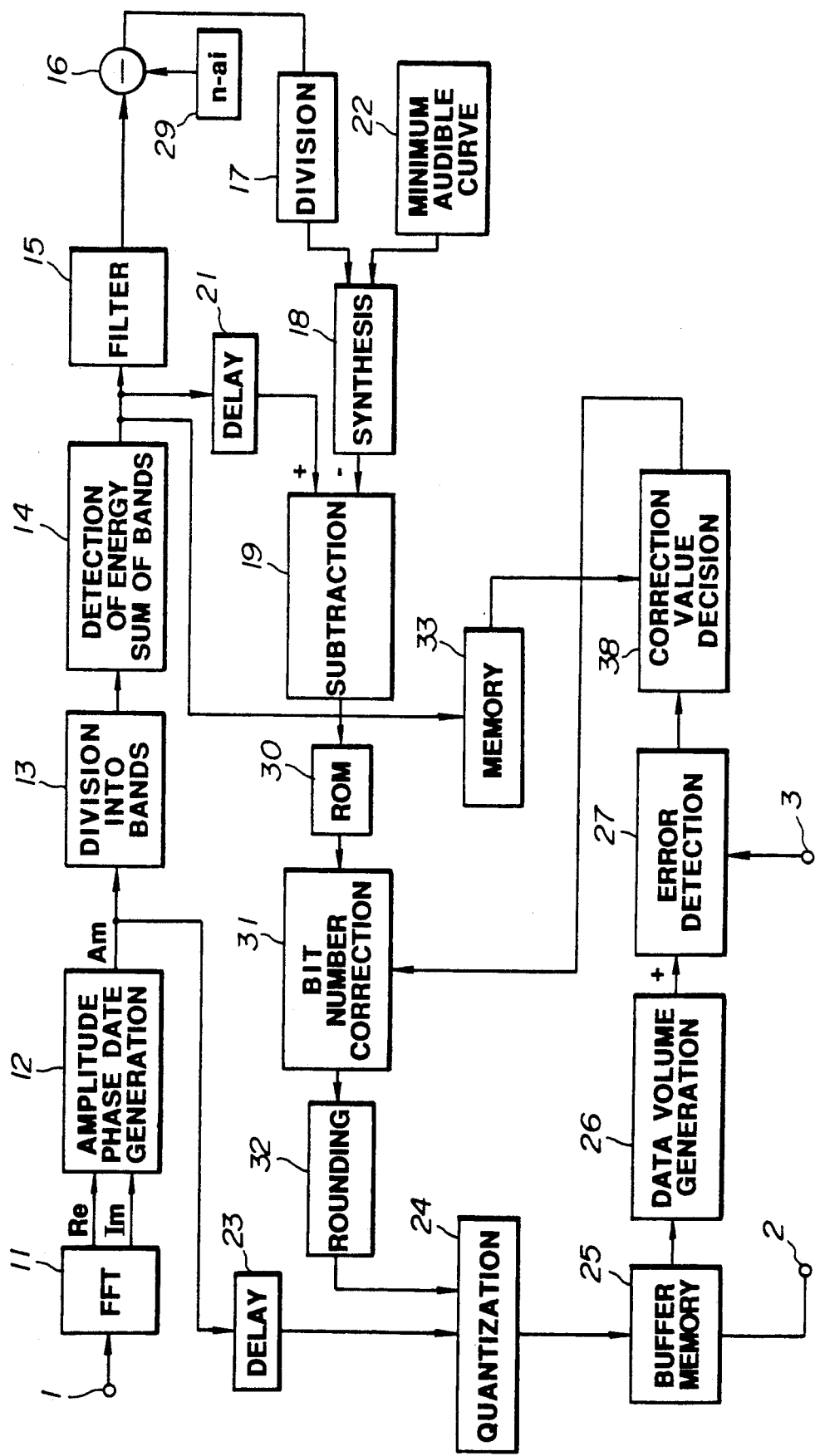
FIG. 11 is a block circuit diagram showing an outline of a digital signal encoding apparatus according to a modification of the present invention.
Figure 12:
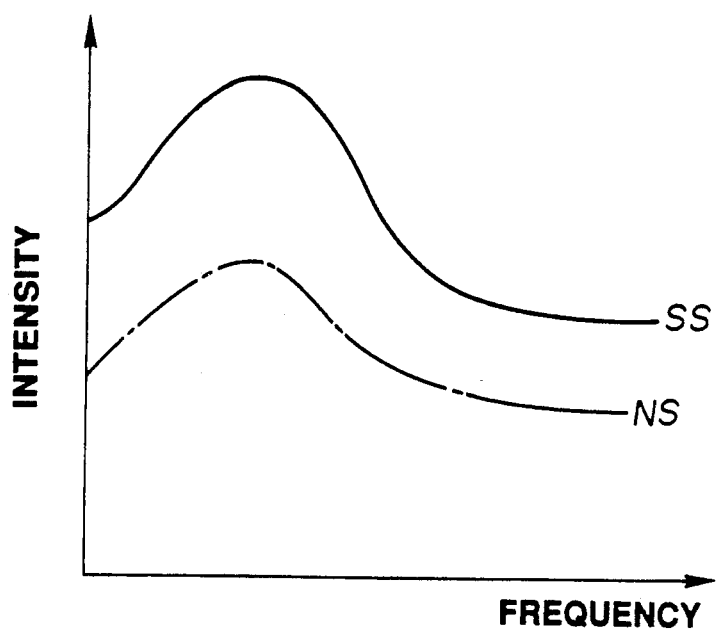
FIG. 12 is a chart showing the noise spectrum prior to bit rate adjustment.
Figure 13:
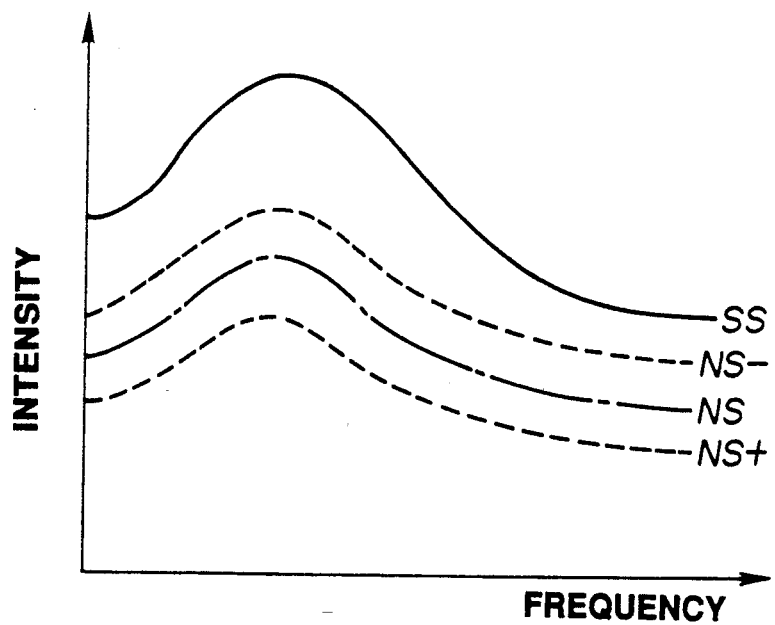
FIG. 13 is a chart showing the noise spectrum following bit rate adjustment.

In this consideration, in a modification of the digital signal encoding apparatus of the present invention, shown in FIG. 11, changes on the frequency axis of the changes in S/N ratio of the audio signals are maintained constant to prevent the occurrence of changes in the noise spectrum on requantization. In FIG. 1, parts or components equivalent to those shown in FIG. 11 are designated by the same reference numerals and the corresponding description is omitted for simplicity. Referring to FIG. 12, the noise spectrum NS is shown by a chain-dotted line, against the signal spectrum SS. If the bit rate is not constant in a unit block, adjustment of bit allocation is performed on the frequency axis by dynamic bit allocation. For example, if, as a result of signal frequency analyses, the number of bits is decreased uniformly from the noise spectrum NS, the noise spectrum NS is corrected to noise spectrum $NS_-$, as shown by a broken line in FIG. 13, whereas, if the number of bits is increased, the noise spectrum is corrected to $NS_-$, as also shown by a broken line in FIG. 13.

Figure 14C:
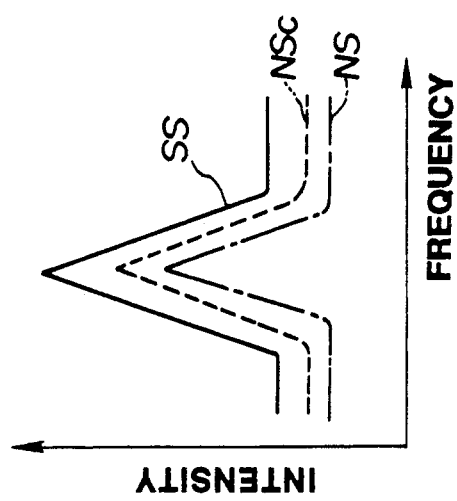
FIG. 14C is a chart showing the noise spectrum, following bit rate adjustment, of a signal having the character of a tone for the case of a deficiency in the number of bits.
Figure 14B:
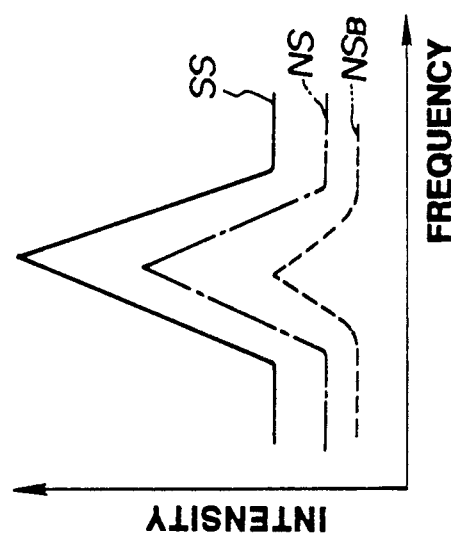
FIG. 14B is a chart showing the noise spectrum, following bit rate adjustment, of a signal having the character of a tone for the case of redundancy of the number of bits.
Figure 14A:
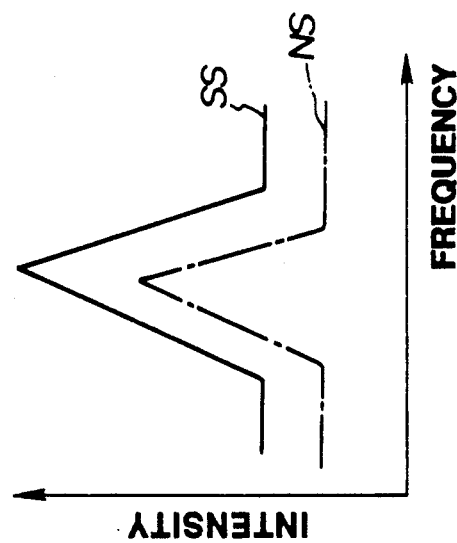
FIG. 14A is a chart showing the noise spectrum, prior to bit rate adjustment, of a signal having the character of a tone.

In case of the signal spectrum SS shown in FIG. 14A, that is, if the source exhibits the character of a tone in which the signal spectrum intensity of signal energy is concentrated in a band, such as in the case of a sinusoidal wave, tone burst wave or a sound of a single musical instrument, the noise spectrum NS is as shown in a chain-dotted line in FIG. 14A, against the signal spectrum SS. Hence, in the present embodiment, shown in FIG. 11, the energy ratio for each band is found from signal frequency analyses and, should the number of bits be redundant for 9 given predetermined number of bits, more or less bits are provided to the bands of higher or lower energies, respectively, in proportion to the signal energy,, by way of performing a bit rate adjustment. In this manner, the noise spectrum NS is corrected to noise spectrum $NS_B$ as shown by a broken line in FIG. 14B. Conversely, should the number of bits fall short, a number of bits are taken from the band of a lesser energy, in inverse proportion to the signal energy, and are provided to the band suffering from shortage in the number of bits. In this manner, the noise spectrum is corrected to $NS_C$ as shown by a broken line in FIG. 14C.

It will be seen from above that, in the apparatus shown in FIG. 11, the volume of the output information of the quantization circuit 24 is detected by a data volume computing circuit 26, and an error between the detection output and a predetermined target value from terminal 3, that is the target value of the bit rate for bit rate adjustment, is detected at an error detection circuit 27. The correction value by which the number of bit allocation for the quantization circuit 24 is then determined at a correction value decision circuit 38, on the basis of the detected error output and the energies of the respective bands. Quantization is then performed at the quantizer on the basis of the so-determined correction value. In this manner, with the present embodiment, a constant information volume for a predetermined time period is provided by performing bit rate adjustment.

To this end, in the present embodiment, the data from buffer memory 25 is transmitted to a data volume computing circuit 26, where the data volume is found and transmitted to an error detection circuit 27. In the error detection circuit 27, an error between the data volume and a predetermined target value from terminal 3, that is, the target value of the bit rate for bit rate adjustment, is detected, and transmitted to a correction value decision circuit 38. To this decision circuit 38 is also supplied an output (energy or spectral intensity) of the sum detection circuit 14 by way of a memory 33 adapted for storing data of a unit block. The correction value decision circuit 38 is adapted to provide a larger or a smaller correction value to a higher energy band if the error data is positive or negative, respectively. This correction value is supplied to a bit number correction circuit 31 where the output of the ROM 20 is corrected by the correction value for correcting the number of allocated quantization bits, that is, for adjusting the bit rate, to provide for a constant information volume in one unit time block as a predetermined time period. In this manner, quantization is performed with a larger number of bits in a band of a larger energy and with a smaller number of bits in a band of a lesser energy. The output of the bit number correction circuit 31 is supplied to the quantization circuit 24 by way of a rounding circuit 32 to correct for minute changes in the number of bits.

It will be noted that the effects similar to those described above may also be obtained with a construction, not shown, in which the correction value decision circuit 38 is designed as a division circuit and the bit number correction circuit 31 is designed as a summation circuit. The division circuit in this case divides the error data by the total number of samples within a unit time block or frame as a predetermined time period and the resulting quotient data are transmitted to the summation circuit. In this summation circuit, the quotient data is added to the output of ROM 20 for correcting the number of allocated quantization bits to provide for a constant information volume over the aforementioned predetermined period. The output of the summation circuit is supplied to the quantization circuit 24 by way of the rounding circuit 32 to correct for minute changes in the number of bits. In this case, the memory 33 shown in FIG. 11 may be eliminated.

In the present embodiment of the digital signal encoding apparatus, shown in FIG. 11, bit rate adjustment is performed at the time of encoding the audio signals, as described above, and the noise spectrum is not changed in shape at this time, so that sound deterioration perceived by ones ears may be diminished even when the number of bits in reduced. Above all, signal encoding with less deterioration may be realized with a source exhibiting the properties of a tone. In addition, the hardware may be implemented easily because of the simplicity of the bit rate adjustment algorithm.

The present invention may be applied to an apparatus performing sub-band coding (SBC) in addition to an apparatus performing the adaptive transform coding in which input digital signals are processed by fast Fourier transform, as in the case of the embodiment shown in FIG. 11. In this case, the signals are divided into a plurality of discrete frequency band by means of band filters or the like. In this case, the quantization noise level consistent with the detection output and the output data volume of quantization means is increased or decreased by the number of bits allocated to each channel for adjusting the number of quantization bits for each block to be constant. Similar effects to those described above may be obtained for the case of sub-band coding. Since the noise level is increased towards the higher frequency with lower energy, it becomes possible to reduce the number of bits allocated for quantization.

What is claimed is:

1. A digital signal encoding apparatus comprising
  noise level setting means for dividing input digital signals into a plurality of frequency bands so that the bandwidth of each frequency band is broader as the frequency of the frequency bands increases, said noise level setting means setting the allowable noise level of each of the plurality of frequency bands on the basis of the energy of each said frequency band,
  quantization means for quantizing components of each frequency band with a number of bits consistent with the level difference between the energy of each frequency band and that of the output of said noise level setting means, and
  means for detecting the number of bits allocated to the output information of said quantization means and for adjusting the number of bits of the output information over a predetermined time interval to be constant as a function of the detection output.

2. The signal encoding apparatus according to claim 1 wherein said noise level setting means includes
  noise level computing means for computing the allowable noise level for each frequency band,
  minimum audible curve setting means for setting a minimum audible curve in dependence upon the frequency, and
  synthesis means for synthesizing outputs of said noise level computing means and said minimum audible curve setting means.

3. The signal encoding apparatus according to claim 2 wherein said noise level computing means is controlled by the detection output from said means for detecting.

4. The signal encoding apparatus according to claim 1 further comprising error detection means for detecting an error between a target value fed thereto and the detection output of said means for detecting the number of bits allocated to the output information volume of said quantization means and producing and output for adjusting the number of bits of the output information to be constant over a predetermined time interval.

5. The signal encoding apparatus according to claim 1 further comprising error detection means for detecting an error between a target value fed thereto and the detection output of said means for detecting, and energy detection means for detecting the energy of each frequency band for controlling said quantization means to allocate the number of bits to the output information in response thereto.

6. A digital signal encoding apparatus comprising
  noise level setting means for dividing input digital signals into a plurality of frequency bands so that the bandwidth of each frequency band is broader as the frequency of the frequency band increases, said noise level setting means setting the allowable noise level of each frequency band on the basis of the energy of each frequency band, and quantization means for quantizing components of each frequency band with a number of bits consistent with the level difference between the energy of each frequency band and that of the output of said level setting means, and means for controlling said noise level setting means for setting the allowable noise level to be higher for the same energy level towards the side of a higher frequency.

* * * * *